(12) United States Patent
Wang et al.

(10) Patent No.: US 11,886,178 B2
(45) Date of Patent: Jan. 30, 2024

(54) FAULT DIAGNOSIS METHOD, METHOD FOR BUILDING FAULT DIAGNOSIS MODEL, EQUIPMENT, DEVICE AND MEDIUM

(71) Applicant: YANTAI JEREH OILFIELD SERVICES GROUP CO., LTD., Yantai (CN)

(72) Inventors: Zongwen Wang, Yantai (CN); Xinmeng Wang, Yantai (CN); Minghua Sun, Yantai (CN); Tao Li, Yantai (CN)

(73) Assignee: YANTAI JEREH OILFIELD SERVICES GROUP CO., LTD., Yantai (CN)

( * ) Notice: Subject to any disclaimer, the term of this patent is extended or adjusted under 35 U.S.C. 154(b) by 0 days.

(21) Appl. No.: 17/984,093

(22) Filed: Nov. 9, 2022

(65) Prior Publication Data
US 2023/0152793 A1 May 18, 2023

(30) Foreign Application Priority Data

Nov. 11, 2021 (CN) .......................... 202111334949.1

(51) Int. Cl.
*G05B 23/02* (2006.01)
*F15B 19/00* (2006.01)
(Continued)

(52) U.S. Cl.
CPC ........ *G05B 23/0254* (2013.01); *F15B 19/005* (2013.01); *G06N 3/08* (2013.01); *G05B 2223/02* (2018.08); *G06N 3/04* (2013.01)

(58) Field of Classification Search
CPC ............ G05B 23/0254; G05B 2223/02; F15B 19/005; G06N 3/08; G06N 3/04; G06F 2218/08; G06F 2218/12; G06F 18/241
See application file for complete search history.

(56) References Cited

U.S. PATENT DOCUMENTS

| | | | | |
|---|---|---|---|---|
| 2009/0300417 A1* | 12/2009 | Bonissone | ......... | G05B 23/0254 714/E11.178 |
| 2021/0319368 A1 | 10/2021 | Motegi et al. | | |
| 2023/0165642 A1* | 6/2023 | Shelton, IV | ....... | A61B 17/1155 128/897 |

FOREIGN PATENT DOCUMENTS

| | | |
|---|---|---|
| CN | 106151004 B | 2/2018 |
| CN | 107701468 A | 2/2018 |

(Continued)

OTHER PUBLICATIONS

Li et al. (A novel data-temporal attention network based strategy for fault diagnosis of chiller sensors, 2019) (Year: 2019).*
Baek et al. (Fault Prediction via Symptom Pattern Extraction Using the Discretized State Vectors of Multisensor Signal, IEEE, 2019) (Year: 2019).*

(Continued)

*Primary Examiner* — Mohammad K Islam

(57) ABSTRACT

The embodiments of the present disclosure provide a fault diagnosis method, a method for building a fault diagnosis model, fault diagnosis equipment, electronic device, and non-transitory computer-readable storage medium. The fault diagnosis method, for diagnosing a fluid device, which includes a suction end and a discharge end, includes: obtaining a data set for diagnosing the fluid device, wherein the data set includes first characteristic data about the suction end, second characteristic data about the discharge end, and input-output difference data, and the input-output difference data represents data difference between the suction end and the discharge end; obtaining a fault diagnosis model; and determining whether the fluid device is in failure based on the fault diagnosis model and the data set.

20 Claims, 9 Drawing Sheets

(51) Int. Cl.
*G06N 3/08* (2023.01)
*G06N 3/04* (2023.01)

(56) References Cited

FOREIGN PATENT DOCUMENTS

| CN | 109213121 | A | 1/2019 |
|---|---|---|---|
| CN | 109947080 | A | 6/2019 |
| CN | 110110809 | A | 8/2019 |
| CN | 110242588 | A | 9/2019 |
| CN | 110513281 | A | 11/2019 |
| CN | 111126603 | A | 5/2020 |
| CN | 110242588 | B | 11/2020 |
| CN | 111308909 | B | 2/2021 |
| CN | 113111832 | A | 7/2021 |
| CN | 113191240 | A | 7/2021 |

OTHER PUBLICATIONS

Jia et al. (Assessment of Data Suitability for Machine Prognosis Using Maximum Mean Discrepancy, 2018) (Year: 2018).*
An, "Dynamic Analysis and Fault Detection of Large Pressure Control Valve," Dissertation Submitted to The Faculty of Graduate of Shandong University for the Degree of Doctor of Engineering, Apr. 15, 2012, English abstract provided.
Tingfeng et al., "Fault Diagnosis Method of the Centrifugal Pump Based on Wavelet Transform—Principal Component Analysis," Journal of Wuhan University of Technology, vol. 34, No. 6, Dec. 2010, English abstract provided.
Written Opinion of the International Searching Authority and International Search Report for PCT/CN2021/139613 dated Jun. 29, 2022.

* cited by examiner

FAULT DIAGNOSIS METHOD, METHOD FOR BUILDING FAULT DIAGNOSIS MODEL, EQUIPMENT, DEVICE AND MEDIUM

CROSS-REFERENCE TO RELATED APPLICATION

The present application claims priority to Chinese Patent Application No. 202111334949.1, filed on Nov. 11, 2021, the content of which is incorporated herein by reference in its entirety.

TECHNICAL FIELD

Embodiments of the present disclosure relate to a fault diagnosis method, a method for building a fault diagnosis model, equipment, device and medium.

BACKGROUND

Fluid machinery is often involved in the production process of petroleum, chemical and other industries. Fluid machinery refers to a machinery that uses fluid as a working medium for energy conversion, such as pumps, compressors, etc. The fluid machinery has a complex structure and various faults. If the fluid machinery fails, its operation will be interrupted, and production efficiency will be seriously affected. In order to ensure normal operation, fault diagnosis of the fluid machinery is required.

SUMMARY

At least one embodiment of the present disclosure provides a fault diagnosis method, for diagnosing a fluid device, the fluid device comprises a suction end and a discharge end, and the method comprises: obtaining a data set for diagnosing the fluid device, wherein the data set comprises first characteristic data about the suction end, second characteristic data about the discharge end, and input-output difference data, and the input-output difference data represents data difference between the suction end and the discharge end; obtaining a fault diagnosis model; and determining whether the fluid device is in failure based on the fault diagnosis model and the data set.

In some embodiments, a fault diagnosis method for diagnosing a fluid device is disclosed. The fluid device includes a suction end and a discharge end. The method includes: training a fault diagnosis model with a sample data set, wherein the fault diagnosis model comprises an encoder and a decoder coupled together, wherein each of the encoder and the decoder comprises a plurality of fully connected layers; obtaining a data set for diagnosing the fluid device, wherein the data set comprises first characteristic data about the suction end, second characteristic data about the discharge end, and input-output difference data, wherein the input-output difference data represents a difference between the first characteristic data and the second characteristic data; inputting the data set to the encoder of the trained fault diagnosis model; and determining whether the fluid device is in failure based on an output from the decoder of the trained fault diagnosis model.

For example, in the fault diagnosis method provided by an embodiment of the present disclosure, the first characteristic data comprises data corresponding to P suction end statistical indicators respectively; the second characteristic data comprises data corresponding to Q discharge end statistical indicators respectively; the input-output difference data comprises difference data corresponding to N intersection indicators respectively, the N intersection indicators are an intersection of the P suction end statistical indicators and the Q discharge end statistical indicators, where both P and Q are positive integers, and N is a positive integer less than or equal to P and less than or equal to Q.

For example, in the fault diagnosis method provided by an embodiment of the present disclosure, the obtaining the fault diagnosis model comprises: obtaining sample data set, wherein the sample data set comprises sample data of the suction end and sample data of the discharge end; determining input-output difference sample data based on the sample data of the suction end and the sample data of the discharge end; and obtaining the fault diagnosis model based on the sample data of the suction end, the sample data of the discharge end and the input-output difference sample data.

For example, in the fault diagnosis method provided by an embodiment of the present disclosure, both the sample data of the suction end and the sample data of the discharge end comprise data corresponding to M statistical indicators; the obtaining the fault diagnosis model further comprises: based on the sample data of the suction end, selecting at least one statistical indicator with a difference significance parameter greater than a threshold value from the M statistical indicators as the P suction end statistical indicators, wherein the difference significance parameter represents indicator difference degree of the fluid device in a normal state and in a fault state; and based on the sample data of the discharge end, selecting at least one statistical indicator with a difference significance parameter greater than a threshold value from the M statistical indicators as the Q discharge end statistical indicators; wherein obtaining the fault diagnosis model based on the sample data of the suction end, the sample data of the discharge end and the input-output difference sample data, comprises: obtaining the fault diagnosis model at least based on data corresponding to the P suction end statistical indicators in the sample data of the suction end, data corresponding to the Q discharge end statistical indicators in the sample data of the discharge end, and the input-output difference sample data, wherein M is a positive integer greater than or equal to P and greater than or equal to Q.

For example, in the fault diagnosis method provided by an embodiment of the present disclosure, the obtaining the fault diagnosis model further comprises: determining at least one intersection indicator of the P suction end statistical indicators and the Q discharge end statistical indicators as the N intersection indicators; and for each of the N intersection indicators, determining data difference between a corresponding indicator of the sample data of the suction end and a corresponding indicator of the sample data of the discharge end as the input-output difference sample data.

For example, in the fault diagnosis method provided by an embodiment of the present disclosure, the sample data of the suction end comprises first sample data of the suction end obtained in a case that the fluid device is in the normal state, and second sample data of the suction end obtained in a case that the fluid device is in the fault state, and both the first sample data of the suction end and the second sample data of the suction end contain data corresponding to the M statistical indicators; based on the sample data of the suction end, selecting at least one statistical indicator with the difference significance parameter greater than the threshold value from the M statistical indicators as the P suction end statistical indicators, comprises: for each statistical indicator of the M statistical indicators, determining difference significance parameters based on the data of corresponding indicators in the first sample data of the suction end and the data of corresponding indicators in the second sample data of the suction end; and selecting at least one statistical indicator with the difference significance parameter greater than the threshold value from the M statistical indicators as the P suction end statistical indicators.

For example, in the fault diagnosis method provided by an embodiment of the present disclosure, the sample data of the discharge end comprises first sample data of the discharge end obtained in a case that the fluid device is in the normal state, and second sample data of the discharge end obtained in a case that the fluid device is in the fault state, wherein both the first sample data of the discharge end and the second sample data of the discharge end contain data corresponding to the M statistical indicators; based on the sample data of the discharge end, selecting at least one statistical indicator with the difference significance parameter greater than the threshold value from the M statistical indicators as the Q discharge end statistical indicators, comprises: for each of the M statistical indicators, determining difference significance parameters based on the data of the corresponding indicators in the first sample data of the discharge end and in the second sample data of the discharge end; selecting at least one statistical indicator with the difference significance parameter greater than the threshold value from the M statistical indicators as the Q discharge end statistical indicators.

For example, in the fault diagnosis method provided by an embodiment of the present disclosure, the M statistical indicators comprise at least one steady-state indicator and at least one transient indicator, each transient indicator is an instantaneous characteristic corresponding to a time in operation data of a time period, and the steady-state indicator is an overall characteristic obtained by comprehensively processing operation data of a time period.

For example, in the fault diagnosis method provided by an embodiment of the present disclosure, data in the sample data set and data in the data set are pressure data; the at least one transient indicator comprises at least one of the following indicators: a pressure peak value, a pressure extreme value, and a value calculated based on the pressure peak value; the at least one steady-state indicator comprises at least one of the following indicators: a pressure mean value, an absolute pressure mean value, a pressure variance, a pressure standard deviation, a pressure root mean square amplitude value, a pressure root mean square value, a pressure waveform indicator, a pressure skewness, and a pressure kurtosis.

For example, in the fault diagnosis method provided by an embodiment of the present disclosure, the fault diagnosis model comprises a neural network model, and the fault diagnosis model comprises a plurality of fully connected layers.

For example, in the fault diagnosis method provided by an embodiment of the present disclosure, obtaining the fault diagnosis model, comprises: in a training process, obtaining a plurality of fault detection thresholds, and determining accuracy parameters of a model corresponding to each of the plurality of fault detection thresholds; determining a fault detection threshold with a maximum accuracy parameter of the model as a fault detection threshold of the fault diagnosis model from the plurality of fault detection thresholds.

At least one embodiment of that present disclosure also provides a method for building a fault diagnosis model, the fault diagnosis model is used to detect a fluid device, the fluid device comprises a suction end and a discharge end, and the method comprises: obtaining a sample data set, wherein the sample data set comprises sample data of the suction end about the suction end and sample data of the discharge end about the discharge end; determining input-output difference sample data based on the sample data of the suction end and the sample data of the discharge end; and obtaining the fault diagnosis model based on training the sample data of the suction end, the sample data of the discharge end and the input-output difference sample data.

At least one embodiment of that present disclosure also provides a fault diagnosis equipment, used to detect a fluid device, wherein the fluid device comprises a suction end and a discharge end, and the fault diagnosis equipment comprises: a data acquisition unit, configured to obtain a data set for diagnosing the fluid device, wherein the data set comprises first characteristic data about the suction end and second characteristic data about the discharge end; a model acquisition unit, configured to obtain a fault diagnosis model; and a fault determination unit, configured to determine whether the fluid device is in failure based on the fault diagnosis model and the data set.

For example, in the fault diagnosis equipment provided by an embodiment of the present disclosure, the first characteristic data comprises data corresponding to P suction end statistical indicators respectively; the second characteristic data comprises data corresponding to Q discharge end statistical indicators respectively; the input-output difference data comprises difference data corresponding to N intersection indicators respectively, the N intersection indicators are an intersection of the P suction end statistical indicators and the Q discharge end statistical indicators, where both P and Q are positive integers, and N is a positive integer less than or equal to P and less than or equal to Q.

For example, in the fault diagnosis equipment provided by an embodiment of the present disclosure, the model acquisition unit is further configured to: obtain sample data set, wherein the sample data set comprises sample data of the suction end and sample data of the discharge end; determine input-output difference sample data based on the sample data of the suction end and the sample data of the discharge end; and obtain the fault diagnosis model based on the sample data of the suction end, the sample data of the discharge end and the input-output difference sample data.

For example, in the fault diagnosis equipment provided by an embodiment of the present disclosure, both the sample data of the suction end and the sample data of the discharge end comprise data corresponding to M statistical indicators; the model acquisition unit is further configured to: based on the sample data of the suction end, select at least one statistical indicator with a difference significance parameter greater than a threshold value from the M statistical indicators as the P suction end statistical indicators, wherein the difference significance parameter represents indicator difference degree of the fluid device in a normal state and in a fault state; and based on the sample data of the discharge end, select at least one statistical indicator with a difference significance parameter greater than a threshold value from the M statistical indicators as the Q discharge end statistical indicators; obtain the fault diagnosis model at least based on data corresponding to the P suction end statistical indicators in the sample data of the suction end, data corresponding to the Q discharge end statistical indicators in the sample data of the discharge end, and the input-output difference sample data, wherein M is a positive integer greater than or equal to P and greater than or equal to Q.

For example, in the fault diagnosis equipment provided by an embodiment of the present disclosure, the model acquisition unit is further configured to: determine at least one intersection indicator of the P suction end statistical indicators and the Q discharge end statistical indicators as the N intersection indicators; and for each of the N intersection indicators, determine data difference between a corresponding indicator of the sample data of the suction end and a corresponding indicator of the sample data of the discharge end as the input-output difference sample data.

For example, in the fault diagnosis equipment provided by an embodiment of the present disclosure, the fault diagnosis model comprises a neural network model, and the fault diagnosis model comprises a plurality of fully connected layers.

At least one embodiment of that present disclosure also provides an electronic device, which comprises: a processor; a memory, comprising one or more computer program modules; the one or more computer program modules are stored in the memory and are configured to be executed by the processor, and the one or more computer program modules comprise instructions for implementing the fault diagnosis method provided by any embodiment of the present disclosure.

At least one embodiment of that present disclosure also provides a non-transitory computer-readable storage medium, for storing non-transitory computer-readable instructions, wherein in a case that the non-transitory computer-readable instructions are executed by a computer, the fault diagnosis method provided by any embodiment of the present disclosure is implemented.

BRIEF DESCRIPTION OF THE DRAWINGS

In order to clearly illustrate the technical solution of the embodiments of the present disclosure, the drawings of the embodiments will be briefly described. It is apparent that the described drawings are only related to some embodiments of the present disclosure and thus are not limitative of the present disclosure.

DETAILED DESCRIPTION

Figure 1:
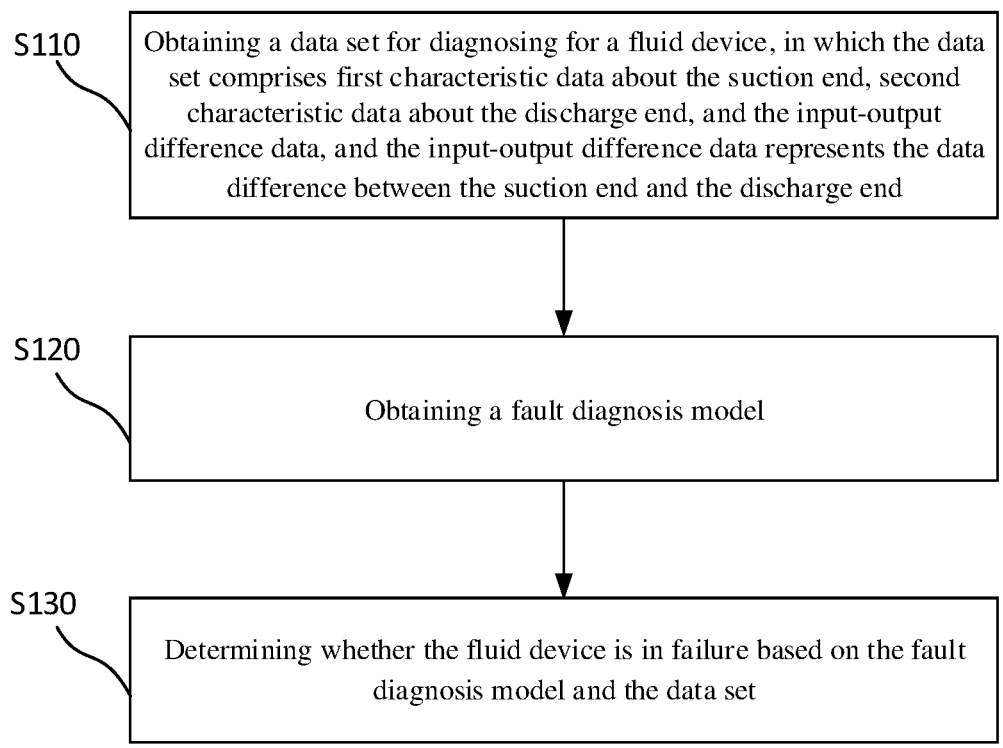
FIG. 1 shows a flow chart of a fault diagnosis method provided by at least one embodiment of the present disclosure.

In order to make objects, technical details and advantages of embodiments of the present disclosure clear, the technical solutions of the embodiments will be described in a clearly and fully understandable way in connection with the related drawings. It is apparent that the described embodiments are just a part but not all of the embodiments of the present disclosure. Based on the described embodiments herein, those skilled in the art can obtain, without any inventive work, other embodiment(s) which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects listed after these terms as well as equivalents thereof, but do not exclude other elements or objects. The phrases "connect", "connected", etc., are not intended to define a physical connection or a mechanical connection, but may comprise an electrical connection which is direct or indirect. The terms "on," "under," "right," "left" and the like are only used to indicate relative position relationship, and in a case that the position of an object is described as being changed, the relative position relationship may be changed accordingly.

There exists fault diagnosis method research for fluid devices. For example, fault detection methods for pump valves include: early warning by setting threshold to monitor the time series fluctuation of indicators, fault detecting by building neural network structure prediction model based on vibration signal, fault detecting based on valve temperature, and corresponding fault detecting based on pressure sensor signal. However, the selection of reference data in the existing fault diagnosis methods is rather one-sided, and failure characteristics are not considered comprehensively, which results in low accuracy of detection results. For example, existing fault diagnosis method for pump valves based on pressure signal has at least the following problems: only overall pressure inside the device or pressure at a certain port is considered, such that the indicator system is not perfect and detection results are inaccurate.

At least one embodiment of the present disclosure provides a fault diagnosis method, a method for building a fault diagnosis model, a fault diagnosis equipment, an electronic device, and a computer-readable storage medium. This fault diagnosis method is used to detect a fluid device, the fluid device comprises a suction end and a discharge end, the fault diagnosis method comprises: obtaining a data set for diagnosing the fluid device, in which the data set comprises first characteristic data about the suction end, second characteristic data about the discharge end, and input-output difference data, and the input-output difference data represents data difference between the suction end and the discharge end; obtaining a fault diagnosis model; and determining whether the fluid device is in failure based on the fault diagnosis model and the data set. In some embodiments, a fault diagnosis method for diagnosing a fluid device is disclosed. The fluid device includes a suction end and a discharge end. The method includes: training a fault diagnosis model with a sample data set, wherein the fault diagnosis model comprises an encoder and a decoder coupled together, wherein each of the encoder and the decoder comprises a plurality of fully connected layers; obtaining a data set for diagnosing the fluid device, wherein the data set comprises first characteristic data about the suction end, second characteristic data about the discharge end, and input-output difference data, wherein the input-output difference data represents a difference between the first characteristic data and the second characteristic data; inputting the data set to the encoder of the trained fault diagnosis model; and determining whether the fluid device is in failure based on an output from the decoder of the trained fault diagnosis model.

The fault diagnosis method provided by at least one embodiment of the present disclosure comprehensively considers the data of the suction end, the data of the discharge end and the input-output difference data to detect the fault, reference characteristics are considered more comprehensively, which reflect operation conditions of the device, thus accuracy of fault diagnosis results is improved.

The fault diagnosis methods in the embodiments of the present disclosure can be used to detect the fluid device, and the fluid device comprises a suction end and a discharge end.

FIG. 1 shows a flow chart of a fault diagnosis method provided by at least one embodiment of the present disclosure.

As illustrated in FIG. 1, the method can include steps S110 to S130. The steps may be performed in various orders. For example, S120 may be performed before or after S110.

Step S110: obtaining a data set for diagnosing a fluid device, in which the data set comprises first characteristic data about the suction end, second characteristic data about the discharge end, and the input-output difference data, and the input-output difference data represents the data difference between the suction end and the discharge end.

Step S120: obtaining a fault diagnosis model. In some embodiments, S120 may include training a fault diagnosis model with a sample data set, wherein the fault diagnosis model comprises an encoder and a decoder coupled together, wherein each of the encoder and the decoder comprises a plurality of fully connected layers.

Step S130: determine whether the fluid device is in failure based on the fault diagnosis model and the data set. In some embodiments, S130 may include inputting the data set to the encoder of the trained fault diagnosis model; and determining whether the fluid device is in failure based on an output from the decoder of the trained fault diagnosis model.

For example, the fluid device is a machine that uses gas, liquid and other fluid as the working fluid for energy conversion. In some examples, the fluid device can be a pump valve. The pump valve is a general name of a pump and a valve, which can be used in liquid transportation process. In the following embodiments, the fault diagnosis method is explained by taking the pump valve as an example. However, the present disclosure is not limited to this, the fault diagnosis method of the embodiments of the present disclosure can also be applied to other fluid devices with a suction end and a discharge end, such as a compressor. The suction end is an inlet for fluid to enter the fluid device, so that the fluid device can pressurize the fluid, the discharge end is an outlet of the fluid device for discharging the treated fluid. Taking the pump valve as an example, the suction end of the pump valve is an inlet of liquid, and the discharge end of the pump valve is an outlet of liquid.

For example, in step S110, the data of the suction end of the fluid device can be obtained as the first characteristic data, and the data of the discharge end can be obtained as the second characteristic data. The first characteristic data and the second characteristic data can be obtained based on operation data collected by the fluid device in a real operation process. For example, the input-output difference data is data difference between the suction end and the discharge end, which can represent difference between the suction end and the discharge end.

For example, the first characteristic data, the second characteristic data, and the input-output difference data may include one or more of pressure data, vibration data, temperature data, and other parameters. In some examples, types of parameters included in the first characteristic data, the second characteristic data and the input-output difference data can be the same. For example, the first characteristic data, the second characteristic data and the input-output difference data are all pressure data. In this case, the input-output difference data can be calculated according to the first characteristic data and the second characteristic data. In other examples, the types of parameters included in the first characteristic data, the second characteristic data and the input-output difference data can be different. For example, the first characteristic data and the second characteristic data are vibration data, and the input-output difference data is pressure data. In this case, the input-output difference data can be calculated according to other collected data except the first characteristic data and the second characteristic data. In the following embodiments, the fault diagnosis method is explained and described by taking the first characteristic data, the second characteristic data and the input-output difference data as the pressure data.

For example, in step S120, the fault diagnosis model can be trained according to sample data in advance. For example, the sample data may include sample data about the suction end, sample data about the discharge end, and sample data about the input-output difference. For example, the fault diagnosis model can be a classification model, and the classification result is, for example, failure or no failure. The fault diagnosis model can be a machine learning model, such as a neural network model, a deep learning model or a classification tree model.

For example, in step S130, the data set (that is, the data set to be diagnosed) is input into the fault diagnosis model, the fault diagnosis model can output classification results according to the data set, and then according to the classification results, whether the fluid device is in failure can be determined.

The fault diagnosis method of the embodiments of the present disclosure comprehensively considers the data of the suction end, the data of the discharge end and the difference data between the suction end and the discharge end for fault detection, the consideration of reference features is more comprehensive, which can well reflect operation conditions of the device, and the accuracy of judgment results is improved.

Figure 2:
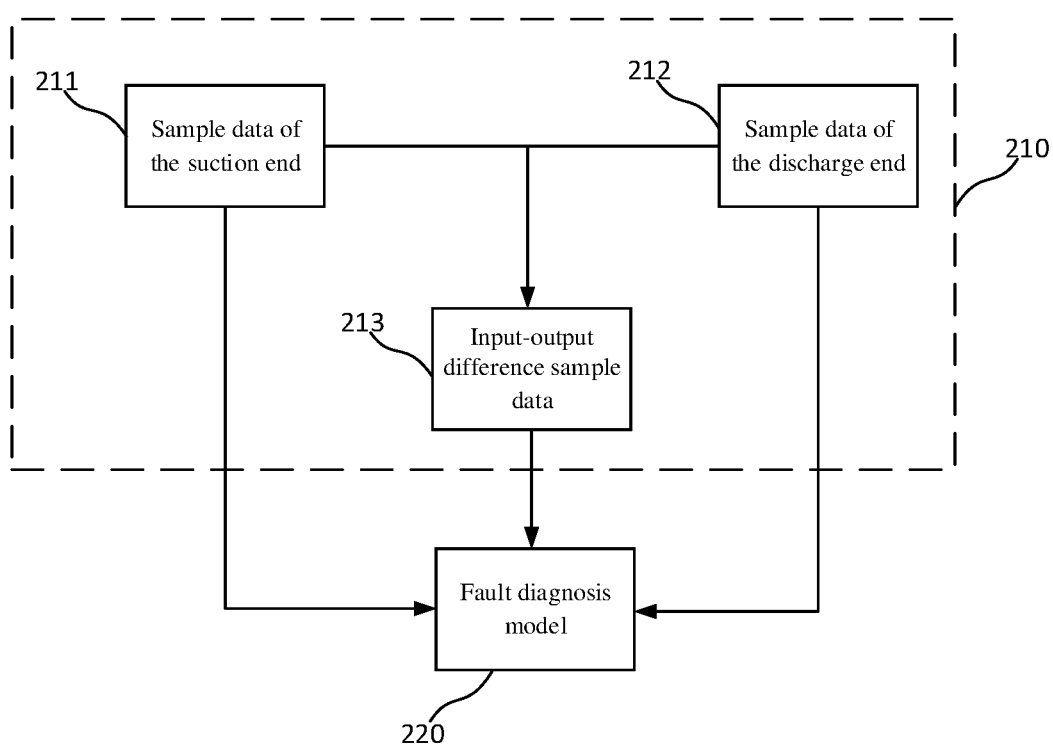
FIG. 2 shows a flow chart of obtaining a fault diagnosis model provided by at least one embodiment of the present disclosure.

FIG. 2 shows a flow chart of obtaining the fault diagnosis model provided by at least one embodiment of the present disclosure. As illustrated in FIG. 2, for example, the process of obtaining the fault diagnosis model comprises: obtaining sample data set 210, and the sample data set 210 comprises sample data of the suction end 211 about the suction end and sample data of the discharge end 212 about the discharge end. Based on the sample data of the suction end 211 and the sample data of the discharge end 212, the input-output difference sample data 213 is determined. Based on the sample data of the suction end 211, the sample data of the discharge end 212 and the input-output difference sample data 213, the fault diagnosis model 220 is obtained.

For example, the sample data of the suction end 211 and the sample data of the discharge end 211 are obtained based on the operation data (such as pressure data) collected by the fluid device under normal operation conditions and the operation data collected by the fluid device under fault conditions. Taking pressure data as an example, pressure sensors with a same type and same sensitivity can be arranged at both the suction end and the discharge end of the fluid device, the pressure sensors at the suction end and the discharge end can collect pressure signal data at a same reasonable collection frequency, and the collected data will be stored structurally.

For example, in the normal operation state and in the fault state respectively, the pressure data at the suction end is collected through the pressure sensor at the suction end for many times, and the collected pressure data is processed to obtain the sample data of the suction end 211. Similarly, in the normal operation state and in the fault state respectively, the pressure data of the discharge end is collected by the pressure sensor at the discharge end for many times, and the collected pressure data is processed to obtain the sample data of the discharge end 212. The input-output difference sample data 213 is obtained by calculating the sample data of the suction end 211 and the sample data of the discharge end 212. Then, the fault diagnosis model can be constructed by using the sample data of the suction end 211, the sample data of the discharge end 212 and the input-output difference sample data 213.

In the fault diagnosis method of the embodiment of the present disclosure, the sample data used to build (e.g., train) the fault diagnosis model comes from normal operation data and fault operation data in an actual operation process on site, so that modeling features are closer to the actual operation. The built (e.g., trained) model is more conducive to actual implementation of industrial production, and overcomes a problem that the failure characteristics caused by the use of laboratory data to build models in relevant technologies cannot accurately reflect actual working conditions on site.

Table 1 below shows operation data provided by at least one embodiment of the present disclosure, as illustrated in Table 1, taking the pressure data as an example, under normal operation of a fluid device, the pressure data of the suction end and the pressure data of the discharge end can be continuously collected for many times, an operation data set of the suction end [An1, An2, An3, An4, An5, An6, An7, An8, An9, . . . ] in the normal operation state and an operation data set of the discharge end [Bn1, Bn2, Bn3, Bn4, Bn5, Bn6, Bn7, Bn8, Bn9, . . . ] in the normal operation state are obtained. Similarly, under fault conditions, the pressure data of the suction end and the pressure data of the discharge end are continuously collected for many times, an operation data set [Af1, Af2, Af3, Af4, Af5, Af6, Af7, Af8, Af9, . . . ] of the suction end under fault conditions and an operation data set [Bf1, Bf2, Bf3, Bf4, Bf5, Bf6, Bf7, B18, Bf9, . . . ] of the discharge end under fault conditions are obtained. The data in the operation data set of the suction end and the operation data set of the discharge end can be arranged according to a sequence of collection time. The number of the operation data collected at the suction end and the number of the operation data collected at the discharge end can be determined according to an actual situation, which are not limited in the embodiments of the present disclosure.

TABLE 1

|  | The suction end | The discharge end |
|---|---|---|
| Normal operation | An1 | Bn1 |
|  | An2 | Bn2 |
|  | An3 | Bn3 |
|  | An4 | Bn4 |
|  | An5 | Bn5 |
|  | An6 | Bn6 |
|  | An7 | Bn7 |
|  | An8 | Bn8 |
|  | An9 | Bn9 |
|  | . . . | . . . |
| Fault operation | Af1 | Bf1 |
|  | Af2 | Bf2 |
|  | Af3 | Bf3 |
|  | Af4 | Bf4 |
|  | Af5 | Bf5 |
|  | Af6 | Bf6 |
|  | Af7 | Bf7 |
|  | Af8 | Bf8 |
|  | Af9 | Bf9 |
|  | . . . | . . . |

Taking the suction end as an example, a process of obtaining the sample data of the suction end and the statistical indicators of the suction end based on the operation data of the suction end are described in detail below.

Table 2 below shows an operation data sequence diagram of the suction end provided by at least one embodiment of the present disclosure, as illustrated in Table 2, the operation data of the suction end can be divided according to a unit duration, the unit duration can be determined according to an actual situation, and the present disclosure does not limit this. For example, the operation data set of the suction end under normal operations is continuously divided to obtain sub data series corresponding to a plurality of discrete time periods, for example, sub data series [An1, An2, An3] corresponding to time segment Tn1, sub data series [An4, An5, An6] corresponding to time segment Tn2, sub data series [An7, An8, An9] corresponding to time segment Tn3, etc. Similarly, data series corresponding to a plurality of discrete time periods can be obtained by continuously dividing the data set of suction end under fault conditions, for example, sub data series [Af1, Af2, Af3] corresponding to time period Tf1, sub data series [Af4, Af5, Af6] corresponding to time period Tf2, sub data series [Af7, Af8, Af9] corresponding to time period Tf3, etc.

TABLE 2

|  | The suction end | | | |
|---|---|---|---|---|
|  | Operation data | | Transient indicators | Steady state indicator |
| Normal operation | An1 | | X_n1 | Y_n1 |
|  | An2 | Tn1 | | |
|  | An3 | | | |
|  | An4 | | X_n2 | Y_n2 |
|  | An5 | Tn2 | | |
|  | An6 | | | |

TABLE 2-continued

The suction end

| Operation data | Transient indicators | Steady state indicator |
|---|---|---|
| An7 ⎤ | | |
| An8 ⎬— Tn3 | X_n3 | Y_n3 |
| An9 ⎦ | | |
| ... | ... | ... |
| Fault operation Af1 ⎤ | | |
| Af2 ⎬— Tf1 | X_f1 | Y_f1 |
| Af3 ⎦ | | |
| Af4 ⎤ | | |
| Af5 ⎬— Tf2 | X_f2 | Y_f2 |
| Af6 ⎦ | | |
| Af7 ⎤ | | |
| Af8 ⎬— Tf3 | X_f3 | Y_f3 |
| Af9 ⎦ | | |
| ... | ... | ... |

For example, both the sample data of the suction end and the sample data of the discharge end contain data corresponding to M statistical indicators. The M statistical indicators include at least one steady-state indicator and at least one transient indicator, and M is an integer greater than or equal to 2.

Table 3 below shows a schematic diagram of the M statistical indicators provided by at least one embodiment of the present disclosure. As illustrated in Table 3, transient indicators can include at least one of the following indicators: peak value $x_p$, peak indicator (peak value/root mean square value) C, minimum value $x_{min}$, maximum value $x_{max}$, pulse indicator (peak value/mean value) I and margin indicator (peak value/root mean square amplitude) L. For example, it can be seen that each of the transient indicators is a transient characteristic corresponding to a time in the operation data of a time period. That is, indicators at a certain time contained in the original data such as peak values and indicators generated by a transformation of such indicators are defined as transient indicators, which represent state characteristics of data at a certain time in a time period.

TABLE 3

| Indicator Status Category | statistical indicators | Indicator Status Category | Statistical indicators |
|---|---|---|---|
| Steady state indicators | mean value $\bar{x}$ Absolute mean value $|\bar{x}|$ Variance δ standard deviation $\sigma_x$ square root amplitude $x_r$ Root mean square value $x_{rms}$ Waveform | Transient indicators | peak value $x_p$, peak value indicator C minimum value $x_{min}$ Maximum value $x_{max}$ Pulse indicator I margin indicator L |

TABLE 3-continued

| Indicator Status Category | statistical indicators | Indicator Status Category | Statistical indicators |
|---|---|---|---|
| | indicator W Skewness S Kurtosis K | | |

For example, the steady-state indicators may include at least one of the following indicators: a mean value $\bar{x}$, an absolute mean value $|\bar{x}|$, a variance δ, a standard deviation $\sigma_x$, a root mean square amplitude $x_r$, a root mean square value $x_{rms}$, a waveform indicator W, a skewness S and a kurtosis K. It can be seen that the steady-state indicators are overall characteristics obtained by comprehensively processing the operation data of a time period. That is, secondary indicators such as the mean value, which are completely generated by the original data calculation and evaluate the overall characteristic level of the data, are defined as stable indicators.

For example, in a case that the data in the sample data set and the data set are both pressure data, transient indicators include at least one of the following indicators: a pressure peak value, a pressure extreme value, and a value calculated based on the pressure peak value (such as peak indicator, pulse indicator and margin indicator). The steady-state indicators include at least one of the following indicators: a pressure mean value, an absolute pressure mean value, a pressure variance, a pressure standard deviation, a pressure root mean square amplitude value, a pressure root mean square value, a pressure waveform indicator, a pressure skewness and a pressure kurtosis.

For example, with reference to Table 2 above, the values of the transient indicators and the values of the steady-state indicators illustrated in Table 3 can be calculated according to the operation data in each time period, the value set of the steady-state indicators and the value set of the transient indicators corresponding to the operation data in each time period are obtained. For example, according to the operation data in the time period Tn1, the value set X_n1 of the steady-state indicators and the value set Y_n1 of the transient indicators corresponding to the time period Tn1 are calculated; according to the operation data in the time period Tn2, the value set X_n2 of the steady-state indicators and the value set Y_n2 of the transient indicators corresponding to the time period Tn2 are calculated. Various steady indicator values and various transient indicator values calculated according to the operation data of the suction end are taken as the sample data of the suction end.

Figure 3:
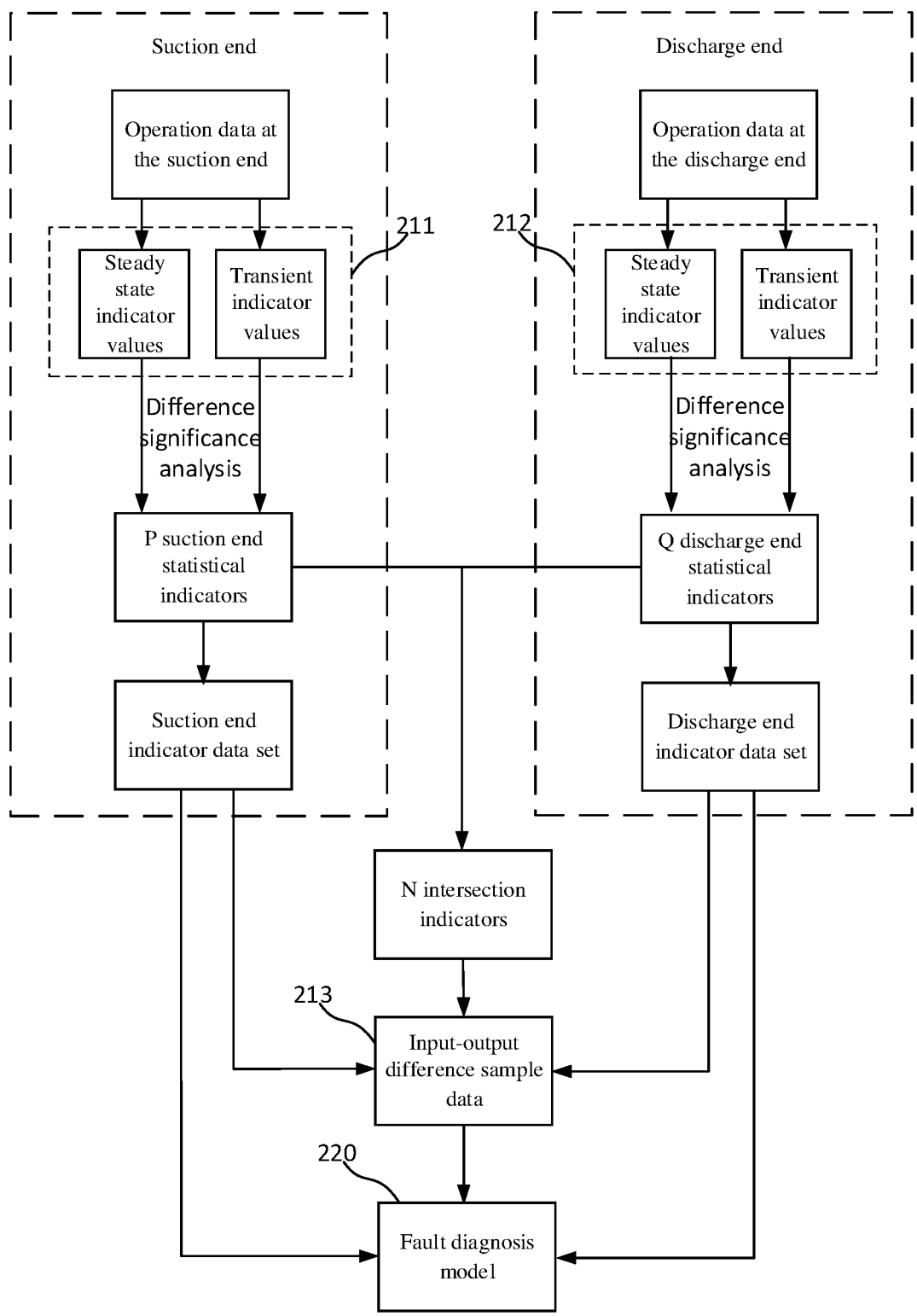
FIG. 3 shows another flow chart of obtaining a fault diagnosis model provided by at least one embodiment of the present disclosure.

FIG. 3 shows another flow chart of obtaining a fault diagnosis model provided by at least one embodiment of the present disclosure. As illustrated in FIG. 3, after the sample data of the suction end 211 is calculated according to the operation data of the suction end, based on the sample data of the suction end 211, at least one statistical indicator whose difference significance parameter is greater than a threshold value can be selected from M statistical indicators (including steady-state statistical indicators and transient statistical indicators) as the P suction end statistical indicators, the difference significance parameter indicates the indicator difference degree of the fluid device in a normal state and in a fault state, in which P is an integer greater than 0 and less than or equal to M.

For example, the sample data of the suction end comprises first sample data of the suction end obtained in a case that the fluid device is in the normal state, and second sample data of the suction end obtained in a case that the fluid device is in the fault state. The first sample data of the suction end and the second sample data of the suction end both contain data corresponding to M statistical indicators. For example, as illustrated in Table 2, all transient indicator values and steady-state indicator values obtained under normal operation conditions are taken as the first sample data of the suction end, all transient indicator values and steady-state indicator values obtained in the fault state are taken as the second sample data of the suction end.

For example, for each of the M statistical indicators, the difference significance parameters are determined based on the data of corresponding indicators in the first sample data of the suction end and the second sample data of the suction end. At least one statistical indicator whose difference significance parameter is greater than the threshold is selected from M statistical indicators as the P suction end statistical indicators. That is, by comparing the sample data of the first suction end and the sample data of the second suction end, the difference degree of each of statistical indicators under normal operation conditions and the fault conditions is determined, a number of statistical indicators with large differences are selected, because data changes of these statistical indicators are obvious when a fault occurs, more accurate and rapid fault analysis and judgment can be achieved by using these statistical indicators.

For example, for each of the transient indicators and each of the steady-state indicators in the M statistical indicators, the difference significance of various indicators in the fault state and in the normal state is calculated. For example, an average relative difference of the same indicator in the fault state and in the normal state is calculated under a same time sequence length, that is $$D\,\text{error} = \left| \text{mean} \left( \frac{Dn_i - Df_i}{Dn_i} \right) \right|, \quad i = 1, 2, \ldots$$

in which Derror represents a difference significance parameter of a certain statistical indicator, $Dn_i$ represents a value of this statistical indicator in the normal state, and $Df_i$ represents a value of the statistical indicator in the fault state.

For example, taking the variance indicator $\delta$ in the steady-state indicator as an example, the difference significance parameter of the variance indicator $\delta$ can be calculated with the following formula:

$$\delta\,\text{error} = \left| \text{mean} \left( \frac{\delta n_i - \delta f_i}{\delta n_i} \right) \right|, \quad i = 1, 2, \ldots$$

in which $\delta$error represents the difference significance parameter of the variance indicator; $\delta n_i$ represents the value of the variance indicator corresponding to $Tn_i$ time period in the normal state, that is, the value of the variance indicator in the steady-state indicator set Y_ni; $\delta f_i$ represents the value of the variance indicator corresponding to time period $Tf_i$ in the fault state, that is, the value of the variance indicator in the steady-state indicator set Y_fi.

For example, with reference to the above method for calculating the difference significance parameters of variance indicators, the difference significance parameters corresponding to each steady-state indicator and each transient indicator of the M statistical indicators can be calculated. Then, comparing the difference significance parameters of each steady-state indicator and each transient indicator with a threshold value, several indicators whose difference significance parameters are greater than the threshold value are selected from all the steady state indicators and the transient indicators as the P suction end statistical indicators. The threshold value can be a preset value, or an average value of the difference significance parameters of the M statistical indicators. As illustrated in FIG. 3, data corresponding to the P suction end statistical indicators (those are, the values of the P suction end statistical indicators) are selected from the sample data of the suction end, the set is a suction end indicator data set $V_{input}$ for subsequent model training.

For example, with reference to the above process of determining the sample data of the suction end and the suction end statistical indicators, the sample data of the discharge end and the discharge end statistical indicators can be obtained accordingly.

For example, as illustrated in FIG. 3, the steady state indicator values and transient indicator values of the discharge end are calculated according to the operation data of the discharge end, and all the steady state indicator values and transient indicator values of the discharge end are taken as the sample data of the discharge end. Based on the sample data of the discharge end, at least one statistical indicator whose difference significance parameter is greater than the threshold value is selected from the M statistical indicators as the Q discharge end statistical indicators, in which Q is an integer greater than 0 and less than or equal to M.

For example, the sample data of the discharge end comprises the first sample data of the discharge end obtained in a case that the fluid device is in the normal state, and the second sample data of the discharge end obtained in a case that the fluid device is in the fault state, the first sample data of the discharge end and the second sample data of the discharge end both contain data corresponding to the M statistical indicators. For example, the steady-state indicator value and the transient indicator value obtained in the normal state are taken as the first sample data of the discharge end, the steady-state indicator value and the transient indicator value obtained in the fault state are taken as the second sample data of the discharge end. For each statistical indicator of the M statistical indicators, the difference significance parameter is determined based on the data of corresponding indicators in the first sample data of the discharge end and the second sample data of the discharge end, and at least one statistical indicator whose difference significance parameter is greater than the threshold value is selected from M statistical indicators as the Q discharge end statistical indicators. As illustrated in FIG. 3, the data set corresponding to the Q discharge end statistical indicators (those are values of the Q discharge end statistical indicators) are selected from the sample data of the discharge end, the data set is a discharge end indicator data set $V_{output}$ for subsequent model training.

For example, in the process of training the fault diagnosis model, at least based on the data corresponding to the P suction end statistical indicators in the sample data of the suction end, the data corresponding to the Q discharge end statistical indicators in the sample data of the discharge end, and the input-output difference sample data, the fault diagnosis model is obtained.

For example, in some embodiments, as illustrated in FIG. 3, at least one intersection indicator of the P suction end statistical indicators and the Q discharge end statistical indicators is determined as N intersection indicators. For each of the intersection indicators, the input-output difference data and the corresponding indicator data in the sample data of the discharge end is determined as the input-output difference sample data. N is a positive integer less than or equal to P and less than or equal to Q.

For example, the P suction end statistical indicators and the Q discharge end statistical indicators obtained in the above steps are intersected, to obtain common statistical indicators of the suction end and the discharge end, and an absolute value of the difference between the sample data of the suction end and the sample data of the discharge end of each of the common statistical indicators in a same equipment state (the fault state or the normal state) is calculated. For example, both the P suction end statistical indicators and the Q discharge end statistical indicators include a mean value indicator, then the mean value indicator can be used as an intersection indicator, an absolute value $|\bar{x}_{input}-\bar{x}_{output}|$ of the difference between the mean value $\bar{x}_{input}$ at the suction end and the mean value $\bar{x}_{output}$ at the discharge end in a same state (the normal state or the fault state) is calculated, the absolute value $|\bar{x}_{input}-\bar{x}_{output}|$ of the difference of the mean values is taken as a difference sample data between the suction end and the discharge end. Based on the method, the absolute value of the difference corresponding to each of the intersection indicators can be determined, the set of the absolute values of the difference of all the intersection indicators is considered as an input-output difference sample data set $V_{in\_out}$ for subsequent model training.

For example, based on the data set of the indicators at the suction end $V_{input}$, the data set of the indicators at the discharge end $V_{output}$ and the input-output difference sample data $V_{in\_out}$, build feature set $V=\{V_{input}, V_{output}, V_{in\_out}\}$. Then, the feature set V can be used to train the fault diagnosis model.

For example, after obtaining the fault diagnosis model, steps S110 to S130 can be used for fault detection. In step S110, the first characteristic data comprises the data corresponding to the P suction end statistical indicators respectively, and the second characteristic data comprises the data corresponding to the Q discharge end statistical indicators respectively. As mentioned above, the P suction end statistical indicators are the statistical indicators whose difference significance parameters at the suction end are greater than the threshold value and selected from the M statistical indicators. The difference significance parameters at the suction end represent the difference degree of the indicator data of the fluid device at the suction end in two states (the normal state and the fault state). The Q discharge end statistical indicators are the statistical indicators whose difference significance parameters at the discharge end are greater than the threshold value and selected from the M statistical indicators. The difference significance parameters at the discharge end represent the difference degree of the indicator data of the fluid device at the discharge end in two states (the normal state and the fault state). The input-output difference data comprises difference data corresponding to N intersection indicators respectively, and the N intersection indicators are an intersection of the P suction end statistical indicators and the Q discharge end statistical indicators.

Figure 4:
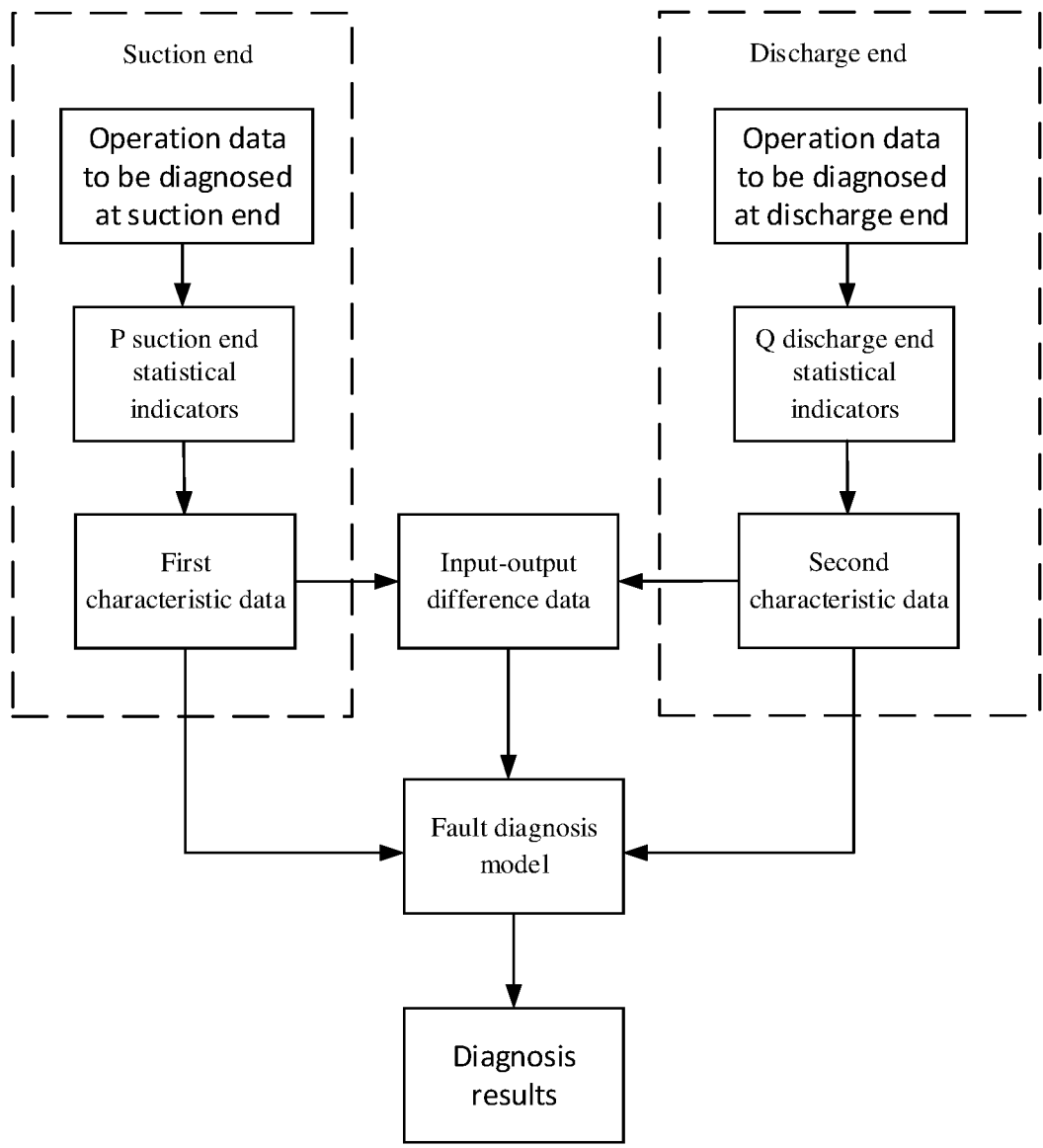
FIG. 4 shows a flow chart of fault diagnosis using a fault diagnosis model provided by at least one embodiment of the present disclosure.

FIG. 4 shows a flow chart of fault diagnosis using a fault diagnosis model provided by at least one embodiment of the present disclosure. As illustrated in FIG. 4, for example, in the process of fault diagnosis, the operation data (such as pressure data) of the suction end and the discharge end can be collected continuously for many times, the operation data of the suction end and the discharge end are taken as the operation data to be diagnosed. The values of the P suction end statistical indicators are calculated according to the operation data to be diagnosed of the suction end, and the values of the P suction end statistical indicators are taken as the first characteristic data. Similarly, the values of the Q discharge end statistical indicators are calculated according to the operation data to be diagnosed of the discharge end, the values of the Q discharge end statistical indicators are taken as the second characteristic data. Then, for each of the intersection indicators of the suction end and the discharge end, the difference between the corresponding indicators in the first characteristic data and the second characteristic data is calculated, which is taken as the input-output difference data. For example, the intersection indicators include mean indicator, difference between the value of the mean indicator in the first characteristic data and the value of the mean indicator in the second characteristic data is taken as an input-output difference data, in this way, the input-output difference data corresponding to each of the intersection indicators can be obtained. Then, the first characteristic data, the second characteristic data, and the input-output difference data are input into the fault diagnosis model, the fault diagnosis model can obtain diagnosis results according to the characteristic data that are input, and according to the diagnosis results, it can be judged that the fluid device is in fault or operates normally (not in fault).

On the one hand, the fault diagnosis method of the embodiments of the present disclosure considers the transient indicators and the steady state indicators, compared with indicators in a single state, the indicator system of the embodiments of the present disclosure is more complete. On the other hand, according to numerical difference degree of each of the indicators in the normal state and in the fault state, several indicators with large difference degree are selected for model training, and these indicators with large difference degree have obvious changes in case of fault, thus the fault state can be reflected more sensitively, which is helpful to achieve accurate and rapid fault analysis and judgment. On another hand, in the embodiment of the present disclosure, the suction end statistical indicators with significant difference at the suction end are selected according to the suction end data. The discharge end statistical indicators with significant difference at the discharge end are selected according to the discharge end data. That is, appropriate statistical indicators are selected from both the suction end and the discharge end. Based on the method, the difference of multiple end data is considered. Compared with the method that both the suction end and the discharge end adopt the same statistical indicators, the embodiment of the present disclosure uses the significant characteristics of both the suction end and the discharge end to make fault judgment, so that the judgment result can be more accurate. On another hand, the embodiments of the present disclosure are based on the intersection indicators of the suction end statistical indicators and the discharge end statistical indicators, the input-output difference data is calculated, the suction end data, the discharge end data, and the input-output difference data are applied to a fault judgment process, and the fault analysis and judgment are conducted from multiple perspectives and multiple levels, so that the diagnosis result can be more accurate.

For example, the fault diagnosis model comprises a neural network model, and the fault diagnosis model may comprise a plurality of fully connected layers.

Figure 5:
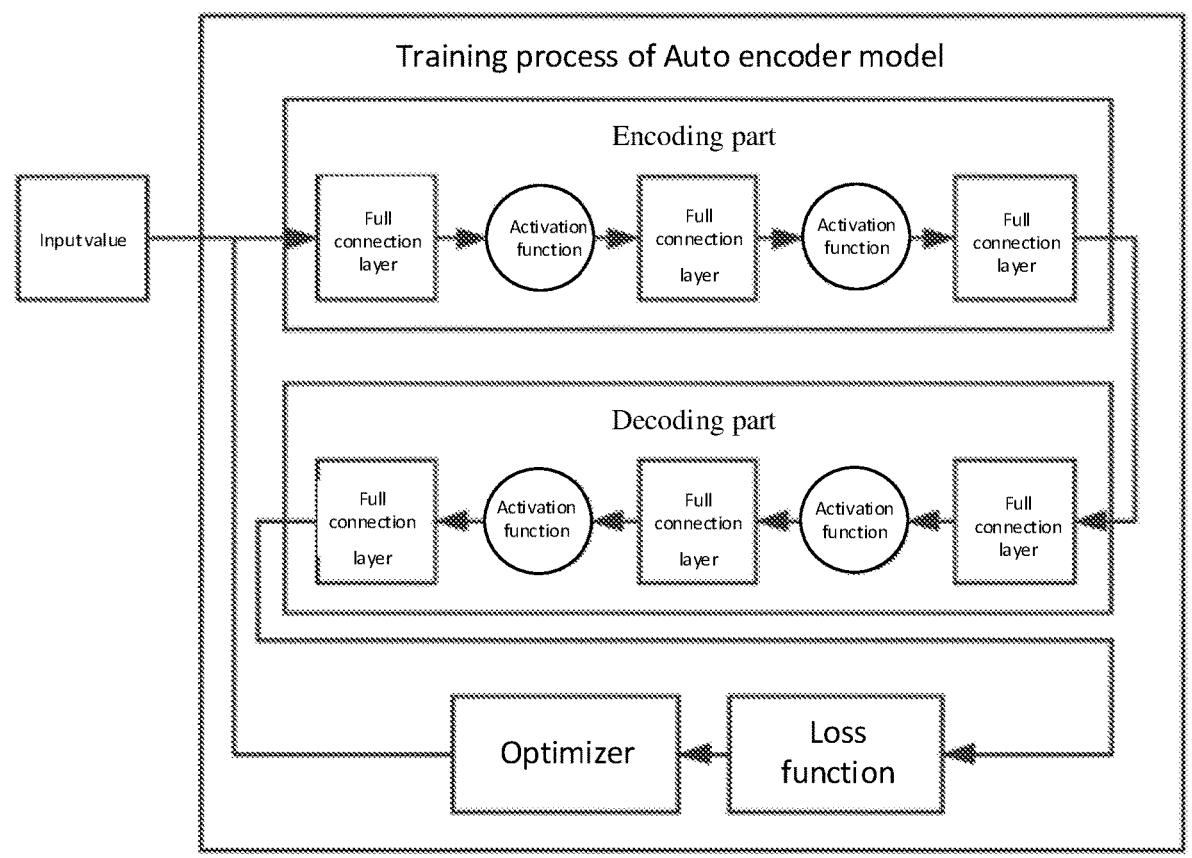
FIG. 5 shows a flow chart of a training process of the fault diagnosis model provided by at least one embodiment of the present disclosure.
Figure 6:
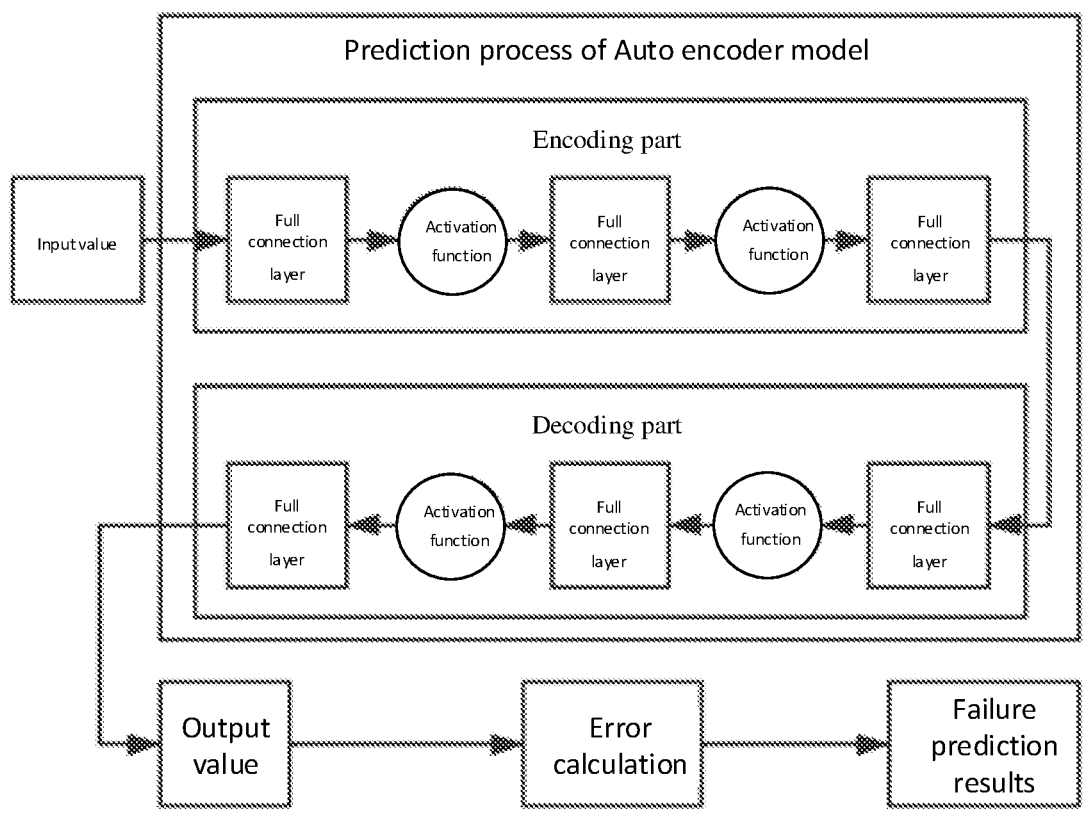
FIG. 6 shows a flow chart of a prediction process of the fault diagnosis model provided by at least one embodiment of the present disclosure.

FIG. 5 shows a flow chart of a training process of the fault diagnosis model provided by at least one embodiment of the present disclosure. FIG. 6 shows a flow chart of a prediction process of the fault diagnosis model provided by at least one embodiment of the present disclosure. As illustrated in FIG. 5 and FIG. 6, the fault diagnosis model can be an auto encoder network structure model, the auto encoder model in the embodiment of the present disclosure can include two parts: an encoder part (encoding part) and a decoder part (decoding part). The auto encoder model of the embodiments of the present disclosure is built based on a fully connected network layer, in which the encoder part and the decoder part respectively contain multi-layer fully connected layers (linear). For example, including three layers of fully connected layers, and the tan h( ) function is used as an activation function among each of the fully connected layers. Number of neurons in each of the layers of the encoder part, and each of the layers of the decoder part was distributed symmetrically. The loss function adopts a mean square error (MSE) loss function, the optimizer adopts an Adam optimizer, the specific number of neurons in each layers of the network can be updated and optimized iteratively according to prediction accuracy of the training data model.

For example, as illustrated in FIG. 5, in the process of model training, the training data set and the testing data set can be divided based on operation signal data of both the discharge end and the suction end of the device obtained on site, and cyclic training and parameter optimization are carried out for the model. In the process of the model training, the training data is calculated in the encoder part and the decoder part, the model loss is calculated according to the mean square error loss function, and then the optimizer is used to update model parameters according to the model loss, which completes an iteration. After several iterations, the fault diagnosis model can be trained and obtained.

For example, as illustrated in FIG. 6, in the process of applying the fault diagnosis model to the fault diagnosis, after the data to be diagnosed are calculated by the encoder part and the decoder part, output values of the model are obtained, failure prediction result is obtained after error calculation of the output values of the model, and the fault prediction result is a fault diagnosis result.

The fault diagnosis method in the embodiment of the present disclosure constructs a fully connected network structure self encoder model without (self) supervision. Thus, imbalance problem of positive data samples and negative data samples is not necessary to be considered. It overcomes the problem of low prediction accuracy caused by unbalanced of the positive data samples and the negative samples when relevant technical centers adopt supervised machine learning methods.

For example, in the process of training, a plurality of fault detection thresholds can be obtained, and model accuracy parameters corresponding to each of the fault detection thresholds are determined. From the plurality of fault detection thresholds, the fault detection threshold with a largest model accuracy parameter is determined, which is used as the fault detection threshold of the fault diagnosis model.

For example, by setting fault detection thresholds of different sizes, Area Under Curve (AUC) values for each of the fault detection thresholds are calculated, and the fault detection threshold corresponding to the maximum AUC is selected as the fault detection threshold of the auto encoder model, so that fault detection which is judged based on statistical indicator characteristic under multi end and multi state is realized.

The embodiment of the present disclosure further provides a method for building a fault diagnosis model, the fault diagnosis model is used to detect a fluid device, and the fluid device comprises a suction end and a discharge end.

Figure 7:
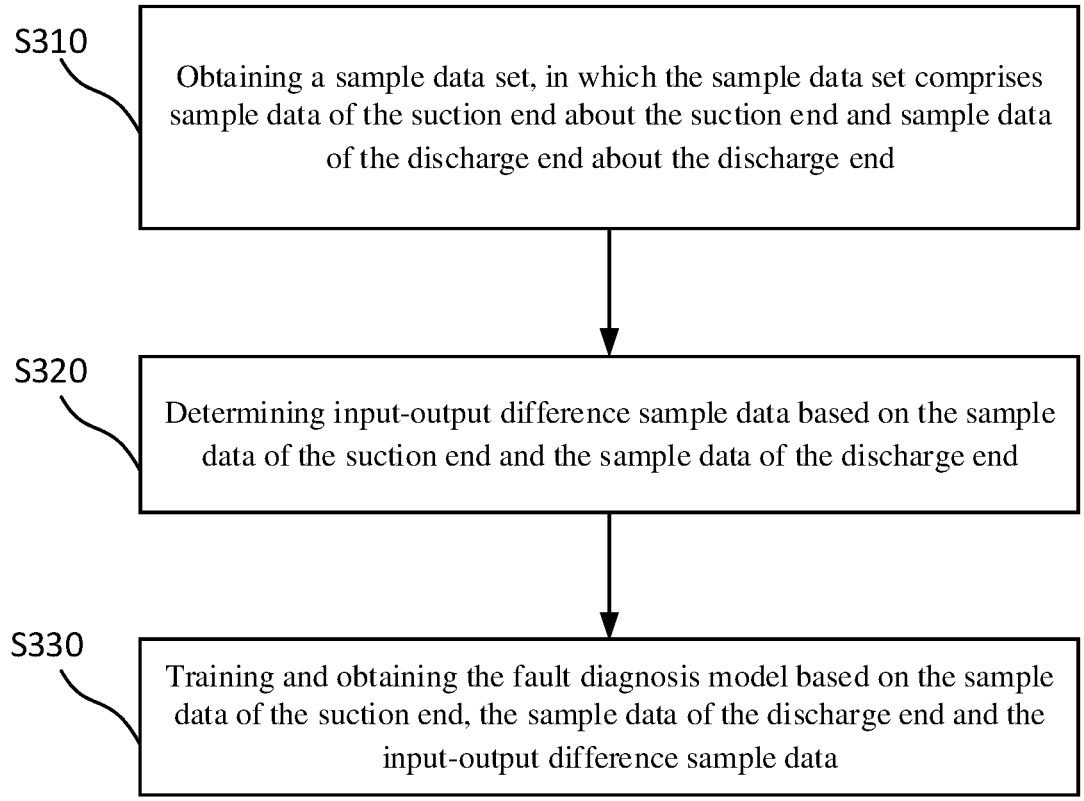
FIG. 7 shows a flow chart of a method for building a fault diagnosis model provided by at least one embodiment of the present disclosure.

FIG. 7 shows a flow chart of a method for building a fault diagnosis model provided by at least one embodiment of the present disclosure. As illustrated in FIG. 7, the method can include steps S310 to S330.

Step S310 includes: obtaining a sample data set, in which the sample data set comprises sample data of the suction end about the suction end and sample data of the discharge end about the discharge end.

Step S320 includes: determining input-output difference sample data based on the sample data of the suction end and the sample data of the discharge end.

Step S330 includes: obtaining the fault diagnosis model based on training the sample data of the suction end, the sample data of the discharge end, and the input-output difference sample data.

The method of building a fault diagnosis model in the embodiments of the present disclosure can be specifically referred to the relevant contents about model building in the embodiments of the above fault diagnosis method, which will not be described in detail herein.

For example, in some embodiments, the training process of the fault diagnosis model can have the following steps:
(1) collecting operation data of a suction direction and a discharge direction of the fluid device in the normal state and in the fault state;
(2) calculating the transient statistical indicator value and the steady-state statistical indicator value of the suction end, and constructing the suction end statistical indicator set by comparing significant differences between the statistical indicators in the normal state and in the fault state, and retaining the statistical indicators with large significant differences;
(3) calculating the transient statistical indicator value and the steady-state statistical indicator value of the discharge end, and constructing the discharge end statistical indicator set by comparing significant differences between the statistical indicators in the normal state and in the fault state of the pump valve, and retaining the statistical indicator with large significant differences;
(4) calculating difference between two ends of each of the statistical indicators at the suction end and the discharge end in a case that the device is in the normal state and in the fault state respectively, and constructing the difference data set between the suction end and the discharge end with the difference indicator at the two ends as an object;
(5) constructing a multi end and multi state characteristic indicator system by combining the suction end statistical indicator set, the discharge end statistical indicator set and the difference data set between the suction end and the discharge end;
(6) constructing an auto encoder network model based on DNN for model training, optimization and testing.

The embodiment of the present disclosure further provides a fault diagnosis equipment for diagnosing a fluid device, and the fluid device comprises a suction end and a discharge end.

Figure 8:
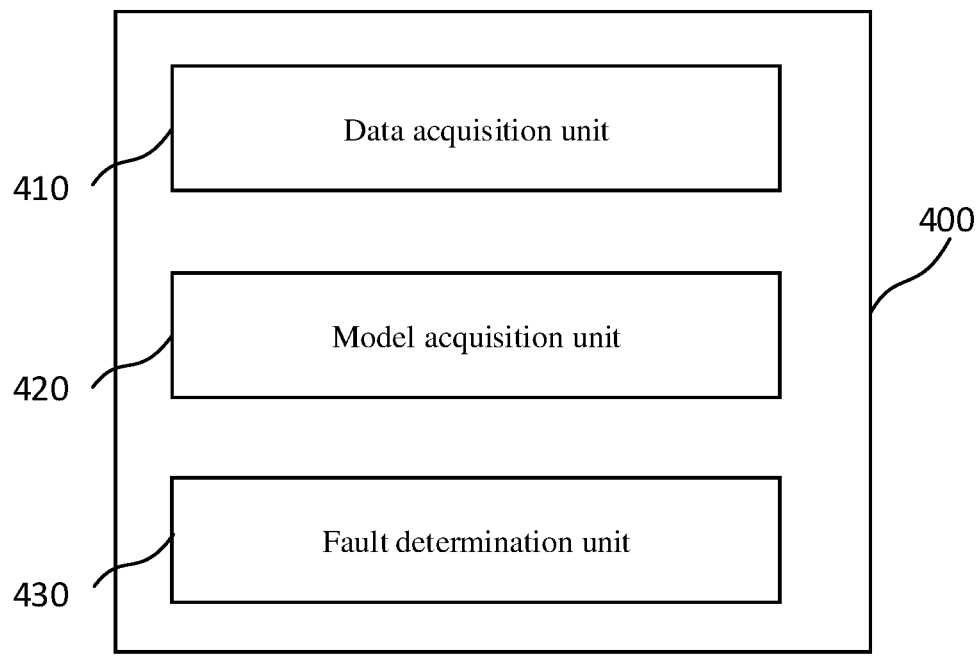
FIG. 8 shows a schematic block diagram of a fault diagnosis equipment provided by at least one embodiment of the present disclosure.

FIG. 8 shows a schematic block diagram of a fault diagnosis equipment 400 provided by at least one embodiment of the present disclosure.

As illustrated in FIG. 8, the fault diagnosis equipment 400 comprises a data acquisition unit 410, a model acquisition unit 420, and a fault determination unit 430.

The data acquisition unit 410 is configured to acquire a data set for diagnosing the fluid device. The data set comprises first characteristic data about the suction end and second characteristic data about the discharge end. The data acquisition unit 410 may, for example, perform the step S110 described in FIG. 1.

The model acquisition unit 420 is configured to obtain a fault diagnosis model. The model acquisition unit 420 may, for example, perform the step S120 described in FIG. 1.

The fault determination unit 430 is configured to determine whether the fluid device is in failure based on the fault diagnosis model and the data set. The fault determination unit 430 may, for example, perform the step S130 described in FIG. 1.

The fault diagnosis equipment 400 comprehensively considers the suction end data, the discharge end data, and the difference data at the suction end and the discharge end for fault detection. Reference characteristics are considered more comprehensively, which can well reflect operation conditions of the fault diagnosis equipment, and the accuracy of judgment results is improved.

For example, the data acquisition unit 410, the model acquisition unit 420, and the fault determination unit 430 may be hardware, software, firmware, and any feasible combination of them. For example, the data acquisition unit 410, the model acquisition unit 420, and the fault determination unit 430 may be a dedicated circuit or a general-purpose circuit, a chip, or a device, or a combination of a processor and a memory. The embodiments of the present disclosure do not limit the specific implementation forms of the above units.

In the embodiment of the present disclosure, each of the units of the fault diagnosis equipment 400 corresponds to each of the steps of the aforementioned fault diagnosis method, specific functions of the fault diagnosis equipment 400 can be referred to the relevant descriptions of the fault diagnosis method, which will not be repeated herein. Components and structures of the fault diagnosis equipment 400 illustrated in FIG. 8 are only exemplary, not restrictive, as required, the fault diagnosis equipment 400 can further include other components and structures.

For example, the first characteristic data comprises data corresponding to the P suction end statistical indicators respectively; the second characteristic data comprises data corresponding to the Q discharge end statistical indicators respectively; the input-output difference data comprises difference data corresponding to the N intersection indicators, and the N intersection indicators are an intersection of the P suction end statistical indicators and the Q discharge end statistical indicators, in which P and Q are positive integers, and N is a positive integer less than or equal to P and less than or equal to Q.

For example, the model acquisition unit 420 is further configured to acquire the sample data set, in which the sample data set comprises the sample data of the suction end about the suction end and the sample data of the discharge end about the discharge end; determine the input-output difference sample data based on the sample data of the suction end and the sample data of the discharge end; and obtain the fault diagnosis model based on the sample data of the suction end, the sample data of the discharge end and the input-output difference sample data.

For example, both the sample data of the suction end and the sample data of the discharge end contain the data corresponding to the M statistical indicators. The model acquisition unit 420 is further configured to: based on the sample data of the suction end, select at least one statistical indicator from the M statistical indicators whose difference significance parameter is greater than the threshold value as the P suction end statistical indicators, in which the difference significance parameter indicates indicator difference degree of the fluid device in the normal state and in the fault state; based on the sample data of the discharge end, select at least one statistical indicator from the M statistical indicators whose difference significance parameter is greater than the threshold value as the Q discharge end statistical indicators; and at least based on the data corresponding to the P suction end statistical indicators in the sample data of the suction end, the data corresponding to the Q suction end statistical indicators in the sample data of the discharge end, and the input-output difference sample data, to obtain the fault diagnosis model, in which M is a positive integer greater than or equal to P and greater than or equal to Q.

For example, the model acquisition unit 420 is further configured to: determine at least one intersection indicator of the P suction end statistical indicators and the Q discharge end statistical indicators as the N intersection indicators; and for each of the intersection indicators, determine difference between the data of corresponding indicators in the sample data of the suction end and the sample data of the discharge end as the input-output difference sample data.

For example, the sample data of the suction end comprises first sample data of the suction end obtained in a normal state of the fluid device and second sample data of the suction end obtained in a fault state of the fluid device, both the first sample data of the suction end and the second sample data of the suction end contain the data corresponding to the M statistical indicators. The model acquisition unit 420 is further configured to: for each statistical indicator of the M statistical indicators, determine the difference significance parameter based on the data of the corresponding indicators in both the first sample data of the suction end and the second sample data of the suction end; and select at least one statistical indicator whose difference significance parameter is greater than the threshold from the M statistical indicators as the P suction end statistical indicators.

For example, the sample data of the discharge end comprises first sample data of the discharge end obtained in the normal state of the fluid device and second sample data of the discharge end obtained in the fault state of the fluid device, and both the first sample data of the discharge end and the second sample data of the discharge end contain the data corresponding to the M statistical indicators. The model acquisition unit 420 is further configured to: for each statistical indicator of the M statistical indicators, determine the difference significance parameters based on the data of the corresponding indicators in the first sample data of the discharge end and the second sample data of the discharge end; and select at least one statistical indicator whose difference significance parameter is greater than the threshold from the M statistical indicators as the Q discharge end statistical indicators.

For example, the M statistical indicators comprise at least one steady-state indicator and at least one transient indicator, each transient indicator is an instantaneous characteristic corresponding to a time in operation data of a time period, and the steady-state indicator is an overall characteristic obtained by comprehensively processing operation data of a time period.

For example, the data in the sample data set and the data set are pressure data; the transient indicator comprises at least one of the following indicators: a pressure peak value, a pressure extreme value, and a value calculated based on the pressure peak value; the steady state indicator comprises at least one of the following indicators: a pressure mean value, an absolute pressure mean value, a pressure variance, a pressure standard deviation, a pressure root mean square amplitude value, a pressure root mean square value, a pressure waveform indicator, a pressure skewness and a pressure kurtosis.

For example, the fault diagnosis model comprises a neural network model, and the fault diagnosis model comprises a plurality of fully connected layers.

For example, the model acquisition unit 420 is further configured to: during the training process, obtain a plurality of fault detection thresholds, and determine accuracy parameters of the model corresponding to each of the plurality of fault detection thresholds; and from the plurality of fault detection thresholds, determine a fault detection threshold with a maximum of the accuracy parameters of the model as a fault detection threshold of the fault diagnosis model from the plurality of fault detection thresholds.

At least one embodiment of the present disclosure further provides an electronic device, the electronic device comprises a processor and a memory, and the memory comprises one or more computer program modules. The one or more computer program modules are stored in the memory and are configured to be executed by the processor, and the one or more computer program modules include instructions for implementing the above-mentioned fault diagnosis method. The electronic device comprehensively considers the suction end data, the discharge end data and the input-output difference data for fault detection, reference characteristics are considered more comprehensively, which can well reflect the operation conditions of the electronic device, and the accuracy of the judgment results is improved.

Figure 9:
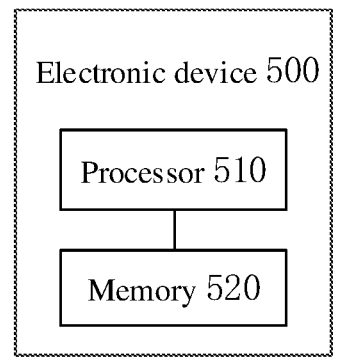
FIG. 9 is a schematic block diagram of an electronic device provided by some embodiments of the present disclosure.

FIG. 9 is a schematic block diagram of an electronic device provided by some embodiments of the present disclosure. As illustrated in FIG. 9, the electronic device 500 comprises a processor 510 and a memory 520. The memory 520 is used to store non-transitory computer-readable instructions (for example, one or more computer program modules). The processor 510 is used to execute non-transitory computer-readable instructions, in a case that a non-transitory computer-readable instruction is run by the processor 510, one or more steps of the above-mentioned fault diagnosis methods may be performed. The memory 520 and the processor 510 may be interconnected by a bus system and/or other form of connection mechanism (not shown).

For example, the processor 510 may be a central processing unit (CPU), a graphics processing unit (GPU), or other form of processing unit with data processing capability and/or program execution capability. For example, the central processing unit (CPU) can be X86 or ARM architecture. The processor 510 may be a general-purpose processor or a dedicated processor, and may control other components in the electronic device 500 to perform a desired function.

For example, the memory 520 may include any combination of one or more computer program products, the computer program products may include various forms of computer-readable storage mediums, such as volatile memory and/or non-volatile memory. The volatile memory may include, for example, a random access memory (RAM) and/or a cache memory. The nonvolatile memory may include, for example, a read-only memory (ROM), a hard disk, an erasable programmable read-only memory (EPROM), a portable compact disk read-only memory (CD-ROM), a USB memory and a flash memory. One or more computer program modules can be stored on the computer-readable storage mediums, the processor 510 may run the one or more computer program modules to implement various functions of the electronic device 500. The computer readable storage mediums can also store various application programs and various data as well as various data used and/or generated by the application programs.

In the embodiment of the present disclosure, the specific functions and technical effects of the electronic device 500 can be referred to the above descriptions of the fault diagnosis method, which will not be repeated herein.

Figure 10:
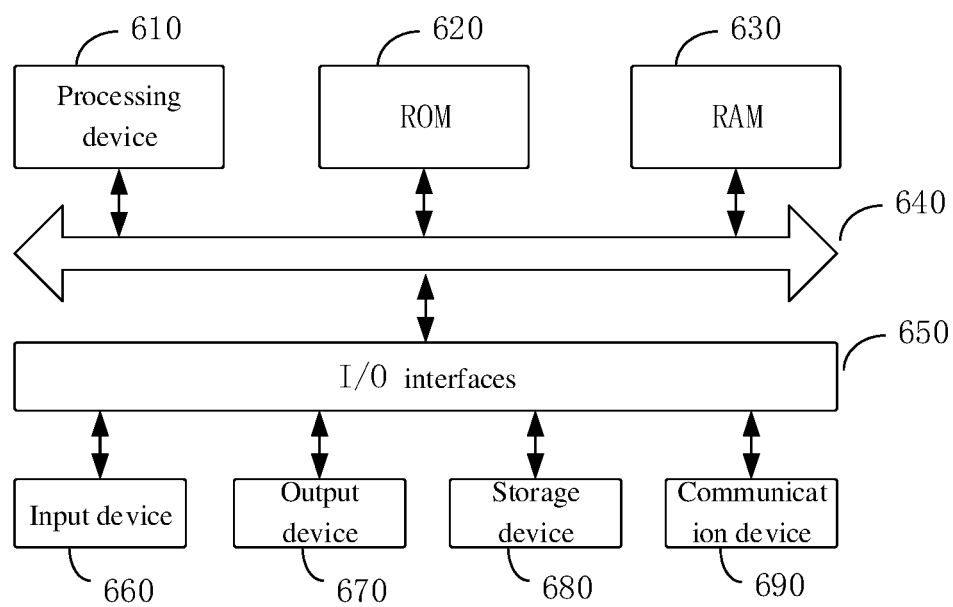
FIG. 10 is a schematic block diagram of another electronic device provided by some embodiments of the present disclosure.

FIG. 10 is a schematic block diagram of another electronic device provided by some embodiments of the present disclosure. The electronic device 600 is, for example, suitable for implementing the fault diagnosis method provided by the embodiments of the present disclosure. The electronic device 600 may be a terminal device. The electronic device 600 illustrated in FIG. 10 is only an example, which will not impose any restrictions on the function and scope of use of the embodiments of the present disclosure.

As illustrated in FIG. 10, the electronic device 600 may include a processing device (such as a central processor, a graphics processor, etc.) 610, which may perform various appropriate actions and processes according to a program stored in a read-only memory (ROM) 620 or a program loaded into a random access memory (RAM) 630 from a storage device 680. In the RAM 630, various programs and data required for the operation of the electronic device 600 are also stored. The processing device 610, the ROM 620, and the RAM630 are connected with each other by a bus 640. The input/output (I/O) interfaces 650 are also connected to the bus 640.

Generally, the following devices can be connected to the I/O interfaces 650: an input device 660, for example, including a touch screen, a touch pad, a keyboard, a mouse, a camera, a microphone, an accelerometer and a gyroscope; an output device 670, for example, including a liquid crystal display (LCD), a loudspeaker and a vibrator; a storage device 680, for example, including a tape and a hard disk; and a communication device 690. The communication device 690 may allow the electronic device 600 to communicate wirelessly or through wire(s) with other electronic devices to exchange data. Although FIG. 10 shows an electronic device 600 with various apparatuses, all the apparatuses illustrated are not required to be implemented or provided with, the electronic device 600 may alternatively implement or provide with more or fewer devices.

For example, according to the embodiment of the present disclosure, the above fault diagnosis method can be implemented as a computer software program. For example, the embodiments of the present disclosure include a computer program product, which comprises a computer program loaded on a non-transitory computer-readable medium, the computer program comprises program codes for performing the above fault diagnosis methods. In such an embodiment, the computer program can be downloaded and installed from the network through the communication device 690, or installed from the storage device 680, or installed from the ROM 620. In a case that the computer program is executed by the processing device 610, the functions defined in the fault diagnosis method provided by the embodiments of the present disclosure can be implemented.

At least one embodiment of the present disclosure further provides a computer-readable storage medium, the computer-readable storage medium is used for storing non-transitory computer-readable instructions, and the above fault diagnosis method can be implemented in a case that the non-transitory computer-readable instructions are executed by the computer. Using the computer-readable storage medium, the suction end data, the discharge end data and the difference data between the suction end and the discharge end can be comprehensively considered for fault detection, reference characteristics are considered more comprehensively, which can well reflect the operation conditions of the device, and the accuracy of the judgment results is improved.

Figure 11:
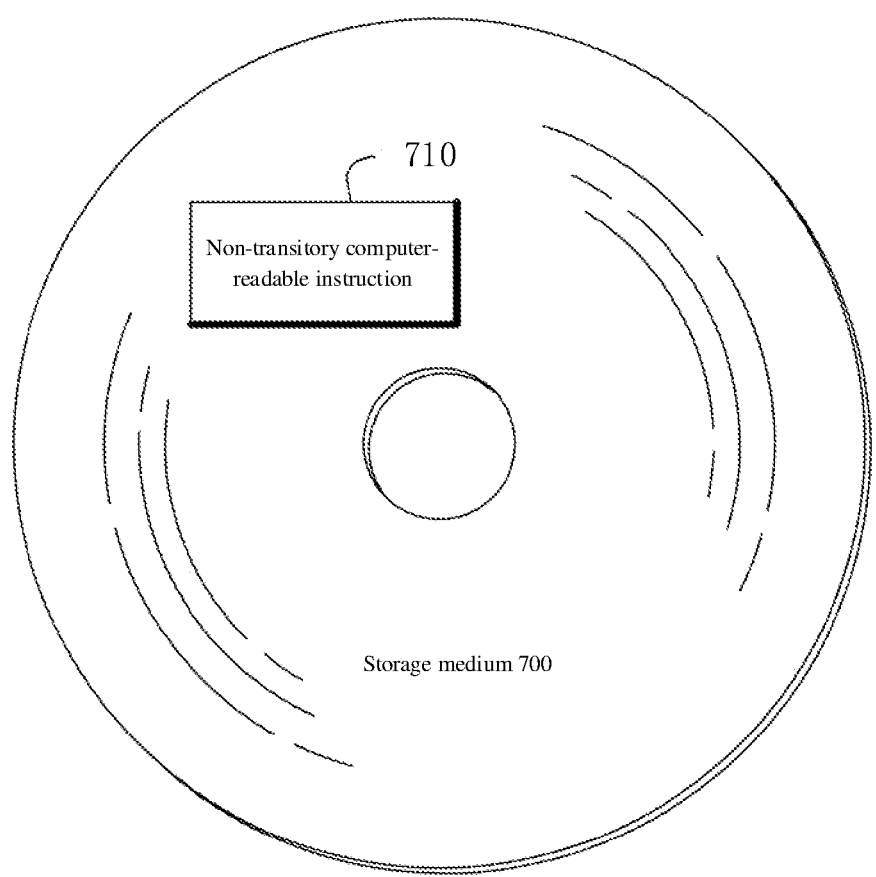
FIG. 11 shows a schematic diagram of a computer-readable storage medium provided by at least one embodiment of the present disclosure.

FIG. 11 shows a schematic diagram of a computer-readable storage medium provided by at least one embodiment of the present disclosure. As illustrated in FIG. 11, the computer-readable storage medium 700 is used to store non-transitory computer-readable instructions 710. For example, in a case that the non-transitory computer-readable instruction 710 is executed by the computer, one or more steps in the fault diagnosis method described above may be performed.

For example, the storage medium 700 may be applied to the electronic device 500 mentioned above. For example, the storage medium 700 may be a memory 520 in the electronic device 500 illustrated in FIG. 9. For example, the related descriptions of the storage medium 700 can be referred to the corresponding descriptions of the memory 520 in the electronic device 500 illustrated in FIG. 9, which will not be repeated herein.

The following points required to be explained:
(1) the drawings of the embodiments of the present disclosure only relate to the structures related to the embodiments of the present disclosure, and other structures can refer to the general design.
(2) without conflict, the embodiments of the present disclosure and the features in the embodiments may be combined with each other to obtain new embodiments.

What are described above is related to only the illustrative embodiments of the present disclosure and not limitative to the protection scope of the present application. Therefore, the protection scope of the present application shall be defined by the accompanying claims.

What is claimed is:

1. A fault diagnosis method, for diagnosing a fluid device, wherein the fluid device comprises a suction end and a discharge end, and the method comprises:
    training a fault diagnosis model with a sample data set, wherein the fault diagnosis model comprises an encoder and a decoder coupled together, wherein each of the encoder and the decoder comprises a plurality of fully connected layers;
    obtaining a data set for diagnosing the fluid device, wherein the data set comprises first characteristic data of the suction end, second characteristic data of the discharge end, and input-output difference data, wherein the input-output difference data represents a difference between the first characteristic data and the second characteristic data;
    inputting the data set to the encoder of the trained fault diagnosis model; and
    determining whether the fluid device is in failure based on an output from the decoder of the trained fault diagnosis model.

2. The fault diagnosis method according to claim 1, wherein:
    the first characteristic data comprises data corresponding to a number P of suction end statistical indicators;
    the second characteristic data comprises data corresponding to a number Q of discharge end statistical indicators;
    the input-output difference data comprises difference data corresponding to a number N of intersection indicators, the number N of intersection indicators are an intersection of the number P of suction end statistical indicators and the number Q of discharge end statistical indicators,
    where both P and Q are positive integers, and N is a positive integer less than or equal to P and less than or equal to Q.

3. The fault diagnosis method according to claim 2, wherein the training the fault diagnosis model comprises:
    obtaining the sample data set, wherein the sample data set comprises sample data of the suction end and sample data of the discharge end;
    determining input-output difference sample data based on the sample data of the suction end and the sample data of the discharge end; and
    training the fault diagnosis model based on the sample data of the suction end, the sample data of the discharge end, and the input-output difference sample data.

4. The fault diagnosis method according to claim 3, wherein:
    both the sample data of the suction end and the sample data of the discharge end comprise data corresponding to a number M of statistical indicators;
    before training the fault diagnosis model, the method further comprises:
    based on the sample data of the suction end, selecting at least one statistical indicator with a difference significance parameter greater than a first threshold value from the number M of statistical indicators as the number P of suction end statistical indicators, wherein the difference significance parameter represents an indicator difference degree of the fluid device in a normal state and in a fault state; and
    based on the sample data of the discharge end, selecting at least one statistical indicator with a difference significance parameter greater than a second threshold value from the number M of statistical indicators as the number Q of discharge end statistical indicators;
    wherein training the fault diagnosis model based on the sample data of the suction end, the sample data of the discharge end, and the input-output difference sample data comprises:
    training the fault diagnosis model at least based on data corresponding to the number P of suction end statistical indicators in the sample data of the suction end, data corresponding to the number Q of discharge end statistical indicators in the sample data of the discharge end, and the input-output difference sample data,
    wherein M is a positive integer greater than or equal to P and greater than or equal to Q.

5. The fault diagnosis method according to claim 4, wherein the training the fault diagnosis model further comprises:
    determining at least one intersection indicator of the number P of suction end statistical indicators and the number Q of discharge end statistical indicators as the number N of intersection indicators; and
    for each of the number N of intersection indicators, determining a data difference between a corresponding indicator of the sample data of the suction end and a corresponding indicator of the sample data of the discharge end as the input-output difference sample data.

6. The fault diagnosis method according to claim 4, wherein:
    the sample data of the suction end comprises first sample data of the suction end obtained when the fluid device is in the normal state, and second sample data of the suction end obtained when the fluid device is in the fault state;

both the first sample data of the suction end and the second sample data of the suction end contain data correspond to the number M of statistical indicators;

based on the sample data of the suction end, selecting at least one statistical indicator with the difference significance parameter greater than the first threshold value from the number M of statistical indicators as the number P of suction end statistical indicators comprises:

for each statistical indicator of the number M of statistical indicators, determining difference significance parameters based on data of corresponding indicators in the first sample data of the suction end and data of corresponding indicators in the second sample data of the suction end; and selecting at least one statistical indicator with the difference significance parameter greater than the first threshold value from the number M of statistical indicators as the number P of suction end statistical indicators.

7. The fault diagnosis method according to claim 4, wherein:

the sample data of the discharge end comprises first sample data of the discharge end obtained when the fluid device is in the normal state, and second sample data of the discharge end obtained when the fluid device is in the fault state;

both the first sample data of the discharge end and the second sample data of the discharge end contain data correspond to the number M of statistical indicators;

based on the sample data of the discharge end, selecting at least one statistical indicator with the difference significance parameter greater than the second threshold value from the number M of statistical indicators as the number Q of discharge end statistical indicators comprises:

for each of the number M of statistical indicators, determining difference significance parameters based on data of corresponding indicators in the first sample data of the discharge end and in the second sample data of the discharge end;

selecting at least one statistical indicator with the difference significance parameter greater than the second threshold value from the number M of statistical indicators as the number Q of discharge end statistical indicators.

8. The fault diagnosis method according to claim 4, wherein:

the number M of statistical indicators comprise a steady-state indicator and at least one transient indicator;

each of the at least one transient indicator is an instantaneous characteristic corresponding to a time in operation data of a time period; and the steady-state indicator is an overall characteristic obtained by processing operation data of the time period.

9. The fault diagnosis method according to claim 8, wherein:

data in the sample data set and data in the data set are pressure data;

the at least one transient indicator comprises at least one of the following indicators: a pressure peak value, a pressure extreme value, and a value calculated based on the pressure peak value; and the steady-state indicator comprises at least one of the following indicators: a pressure mean value, an absolute pressure mean value, a pressure variance, a pressure standard deviation, a pressure root mean square amplitude value, a pressure root mean square value, a pressure waveform indicator, a pressure skewness, and a pressure kurtosis.

10. The fault diagnosis method according to claim 1, wherein:

the fault diagnosis model comprises a neural network model.

11. The fault diagnosis method according to claim 3, wherein the training the fault diagnosis model comprises:

obtaining a plurality of fault detection thresholds;

determining accuracy parameters corresponding to each of the plurality of fault detection thresholds; and determining, from the plurality of fault detection thresholds, a fault detection threshold with a largest accuracy parameter as a fault detection threshold of the fault diagnosis model.

12. An electronic device, for diagnosing a fluid device, wherein the fluid device comprises a suction end and a discharge end, the electronic device comprising:

a processor; and a memory, comprising a non-transitory computer-readable storage medium storing instructions that, when executed by the processor, cause the electronic device to perform operations comprising:

training a fault diagnosis model with a sample data set, wherein the fault diagnosis model comprises an encoder and a decoder coupled together, wherein each of the encoder and the decoder comprises a plurality of fully connected layers;

obtaining a data set for diagnosing the fluid device, wherein the data set comprises first characteristic data of the suction end, second characteristic data of the discharge end, and input-output difference data, wherein the input-output difference data represents a difference between the first characteristic data and the second characteristic data;

inputting the data set to the encoder of the trained fault diagnosis model; and determining whether the fluid device is in failure based on an output from the decoder of the trained fault diagnosis model.

13. The electronic device according to claim 12, wherein:

the first characteristic data comprises data corresponding to a number P of suction end statistical indicators;

the second characteristic data comprises data corresponding to a number Q of discharge end statistical indicators;

the input-output difference data comprises difference data corresponding to a number N of intersection indicators, the number N of intersection indicators are an intersection of the number P of suction end statistical indicators and the number Q of discharge end statistical indicators, where both P and Q are positive integers, and N is a positive integer less than or equal to P and less than or equal to Q.

14. The electronic device according to claim 13, wherein the training the fault diagnosis model comprises:

obtaining the sample data set, wherein the sample data set comprises sample data of the suction end and sample data of the discharge end;

determining input-output difference sample data based on the sample data of the suction end and the sample data of the discharge end; and training the fault diagnosis model based on the sample data of the suction end, the sample data of the discharge end, and the input-output difference sample data.

15. The electronic device according to claim 14, wherein:

both the sample data of the suction end and the sample data of the discharge end comprise data corresponding to a number M of statistical indicators;

before training the fault diagnosis model, the operations further comprise:

based on the sample data of the suction end, selecting at least one statistical indicator with a difference significance parameter greater than a first threshold value from the number M of statistical indicators as the number P of suction end statistical indicators, wherein the difference significance parameter represents an indicator difference degree of the fluid device in a normal state and in a fault state; and based on the sample data of the discharge end, selecting at least one statistical indicator with a difference significance parameter greater than a second threshold value from the number M of statistical indicators as the number Q of discharge end statistical indicators;

wherein training the fault diagnosis model based on the sample data of the suction end, the sample data of the discharge end, and the input-output difference sample data comprises:

training the fault diagnosis model at least based on data corresponding to the number P of suction end statistical indicators in the sample data of the suction end, data corresponding to the number Q of discharge end statistical indicators in the sample data of the discharge end, and the input-output difference sample data, wherein M is a positive integer greater than or equal to P and greater than or equal to Q.

16. The electronic device according to claim 15, wherein the training the fault diagnosis model further comprises:

determining at least one intersection indicator of the number P of suction end statistical indicators and the number Q of discharge end statistical indicators as the number N of intersection indicators; and for each of the number N of intersection indicators, determining a data difference between a corresponding indicator of the sample data of the suction end and a corresponding indicator of the sample data of the discharge end as the input-output difference sample data.

17. A non-transitory computer-readable storage medium for diagnosing a fluid device, wherein the fluid device comprises a suction end and a discharge end, the storage medium storing instructions that, when executed by a processor, cause the processor to perform operations comprising: training a fault diagnosis model with a sample data set, wherein the fault diagnosis model comprises an encoder and a decoder coupled together, wherein each of the encoder and the decoder comprises a plurality of fully connected layers; obtaining a data set for diagnosing the fluid device, wherein the data set comprises first characteristic data of the suction end, second characteristic data of the discharge end, and input-output difference data, wherein the input-output difference data represents a difference between the first characteristic data and the second characteristic data; inputting the data set to the encoder of the trained fault diagnosis model; and determining whether the fluid device is in failure based on an output from the decoder of the trained fault diagnosis model.

18. The non-transitory computer-readable storage medium according to claim 17, wherein:

the first characteristic data comprises data corresponding to a number P of suction end statistical indicators;

the second characteristic data comprises data corresponding to a number Q of discharge end statistical indicators;

the input-output difference data comprises difference data corresponding to a number N of intersection indicators, the number N of intersection indicators are an intersection of the number P of suction end statistical indicators and the number Q of discharge end statistical indicators, where both P and Q are positive integers, and N is a positive integer less than or equal to P and less than or equal to Q.

19. The non-transitory computer-readable storage medium according to claim 18, wherein the training the fault diagnosis model comprises:

obtaining the sample data set, wherein the sample data set comprises sample data of the suction end and sample data of the discharge end;

determining input-output difference sample data based on the sample data of the suction end and the sample data of the discharge end; and training the fault diagnosis model based on the sample data of the suction end, the sample data of the discharge end, and the input-output difference sample data.

20. The non-transitory computer-readable storage medium according to claim 19, wherein:

both the sample data of the suction end and the sample data of the discharge end comprise data corresponding to a number M of statistical indicators;

before training the fault diagnosis model, the operations further comprise:

based on the sample data of the suction end, selecting at least one statistical indicator with a difference significance parameter greater than a first threshold value from the number M of statistical indicators as the number P of suction end statistical indicators, wherein the difference significance parameter represents an indicator difference degree of the fluid device in a normal state and in a fault state; and based on the sample data of the discharge end, selecting at least one statistical indicator with a difference significance parameter greater than a second threshold value from the number M of statistical indicators as the number Q of discharge end statistical indicators;

wherein training the fault diagnosis model based on the sample data of the suction end, the sample data of the discharge end, and the input-output difference sample data comprises:

training the fault diagnosis model at least based on data corresponding to the number P of suction end statistical indicators in the sample data of the suction end, data corresponding to the number Q of discharge end statistical indicators in the sample data of the discharge end, and the input-output difference sample data, wherein M is a positive integer greater than or equal to P and greater than or equal to Q.

* * * * *